(12) United States Patent
Farazi et al.

(10) Patent No.: US 12,670,667 B2
(45) Date of Patent: Jun. 30, 2026

(54) CONVOLUTIONAL NEURAL NETWORKS ON TETRAHEDRAL MESHES

(71) Applicants: Mohammad Farazi, Tempe, AZ (US); Yalin Wang, Tempe, AZ (US)

(72) Inventors: Mohammad Farazi, Tempe, AZ (US); Yalin Wang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 186 days.

(21) Appl. No.: 18/657,564

(22) Filed: May 7, 2024

(65) Prior Publication Data

US 2024/0412456 A1 Dec. 12, 2024

Related U.S. Application Data

(60) Provisional application No. 63/471,587, filed on Jun. 7, 2023.

(51) Int. Cl.
G06T 17/20 (2006.01)
G06T 3/40 (2024.01)

(52) U.S. Cl.
CPC .............. G06T 17/20 (2013.01); G06T 3/40 (2013.01)

(58) Field of Classification Search
None
See application file for complete search history.

(56) References Cited

U.S. PATENT DOCUMENTS

| | | |
|---|---|---|
| 10,210,430 B2 | 2/2019 | Bronstein et al. |
| 2009/0028403 A1* | 1/2009 | Bar-Aviv .............. G06T 7/0012 |
| | | 382/128 |
| 2022/0101602 A1 | 3/2022 | Serrat et al. |

OTHER PUBLICATIONS

Reuter et al. "Discrete Laplace-Beltrami operators for shape analysis and segmentation." Computers & Graphics 33.3 (2009): 381-390. (Year: 2009).*

Azcona, E.A., et al., Interpretation of brain morphology in association to Alzheimer's disease dementia classification using graph convolutional networks on triangulated meshes. In: International Workshop on Shape in Medical Imaging, 2020, pp. 95-107, Springer.

Bessadok, A., et al., Brain multigraph prediction using topology-aware adversarial graph neural network. Med. Image Anal. 2021, 72, 102090.

Bronstein, M.M., et al., Geometric deep learning: Grids, groups, graphs, geodesics, and gauges. arXiv preprint arXiv, 2021,:2104. 13478.

Chandran, V., et al., Supervised learning for bone shape and cortical thickness estimation from ct images for finite element analysis. Med. Image Anal. 2019, 52, 42-55.

Cucurull, G., et al., Convolutional neural networks for mesh-based parcellation of the cerebral cortex, 2018.

(Continued)

*Primary Examiner* — Daniel F Hajnik
*Assistant Examiner* — Jed-Justin Imperial
(74) *Attorney, Agent, or Firm* — SNELL & WILMER L.L.P.

(57) ABSTRACT
Disclosed herein are methods for graphing convolutional neural networks in tetrahedral meshes. In some embodiments, the methods include computing a volumetric Laplace Beltrami Operator. In some embodiments, the methods include feeding the LBO into a neural network. In some embodiments, the methods include down-sampling a tetrahedral mesh.

12 Claims, 4 Drawing Sheets

(56)        References Cited

OTHER PUBLICATIONS

Defferrard, M., et al., Convolutional neural networks on graphs with fast localized spectral filtering. Adv Neural Inf Process Syst, 2016, 29.

Dhillon, I.S., et al., Weighted graph cuts without eigenvectors a multilevel approach. IEEE Trans. Pattern Anal. 2007, 29(11), 1944-1957.

Fan, Y., et al., A tetrahedron-based heat flux signature for cortical thickness morphometry analysis. In: Med Image Comput Comput Assist Interv. 2018, pp. 420-428, Springer.

Farazi, M. et al., TetCNN: Convolutional Neural Networks on Tetrahedral Meshes, Information Processing In Medical Imaging (IPMI), 2023.

Fawaz, A., et al., Benchmarking geometric deep learning for cortical segmentation and neurodevelopmental phenotype prediction. bioRxiv, 2021.

Fey, M., et al., Fast graph representation learning with pytorch geometric. arXiv preprint arXiv:1903.02428, 2019.

Fischl, B.: Freesurfer. Neuroimage, 2012, 62(2), 774-781.

Garland, M., et al., Surface simplification using quadric error metrics. In: Proceedings of the 24th annual conference on Computer graphics and interactive techniques. 1997, pp. 209-216.

Gopinath, K., et al., Learnable pooling in graph convolutional networks for brain surface analysis. IEEE Transactions on Pattern Analysis and Machine Intelligence, 2020, 44(2), 864-876.

Hammond, D.K., et al., Wavelets on graphs via spectral graph theory. Appl Comput Harmon Anal, 2011, 30(2), 129-150.

Hanocka, R., et al., MeshCNN: a network with an edge. ACM Trans. Graph. 2019, 38(4), 1-12.

Huang, S.G., et al., Revisiting convolutional neural network on graphs with polynomial approximations of Laplace-Beltrami spectral filtering. Neural. Comput. Appl. 2021, 33(20), 13693-13704.

Ioffe, S., et al., Batch normalization: Accelerating deep network training by reducing internal covariate shift. In: Proc Int Conf Mach Learn. 2015, pp. 448-456. PMLR.

Jack Jr, C.R., et al.: The Alzheimer's disease neuroimaging initiative (ADNI): MRI methods. J Magn Reson Imaging, 2008, 27(4), 685-691.

Kingma, D.P., et al., A method for stochastic optimization. arXiv preprint arXiv:1412.6980, 2014.

Lian, C., et al.,Hierarchical Fully Convolutional Network for Joint Atrophy Localization and Alzheimer's Disease Diagnosis Using Structural MRI. IEEE Trans Pattern Anal Mach Intell, 2020, 42(4), 880-893.

Liu, H.T.D., et al., Spectral coarsening of geometric operators. arXiv preprint arXiv:1905.05161, 2019.

Nair, V., et al., Rectified linear units improve restricted Boltzmann machines. In: Icml, 2010.

Pope, P.E., et al., Explainability methods for graph convolutional neural networks. In: Proceedings of the IEEE/CVF Conference on Computer Vision and Pattern Recognition. 2019, pp. 10772-10781.

Qi, C.R., et al., Pointnet: Deep learning on point sets for 3D classification and segmentation. In: Proc. IEEE Comput. Soc. Conf. Comput. Vis. Pattern Recognit. 2017, pp. 652-660.

Qiu, S., et al., Development and validation of an interpretable deep learning framework for Alzheimer's disease classification. Brain, 2020, 143(6), 1920-1933.

Si, H.Tetgen, a delaunay-based quality tetrahedral mesh generator. ACM Trans Math Softw. (TOMS) 2015, 41(2), 1-36.

Wang, G., et al., Towards a holistic cortical thickness descriptor: Heat kernelbased grey matter morphology signatures. Neuroimage, 2017, 147, 360-380.

Wang, Y., et al., Dynamic graph CNN for learning on point clouds, 2019.

Zhang, S., et al., 3d global fourier network for alzheimer's disease diagnosis using structural mri. In: Med Image Comput Comput Assist Interv. 2022, pp. 34-43. Springer.

Zhou, Y., et al., Fully convolutional mesh autoencoder using efficient spatially varying kernels. Adv Neural Inf Process Syst, 2020 33, 9251-9262.

Zhu, W., et al., Dual Attention Multi-Instance Deep Learning for Alzheimer's Disease Diagnosis With Structural MRI. IEEE Trans Med Imaging, 2021, 40(9), 2354-2366.

* cited by examiner

CONVOLUTIONAL NEURAL NETWORKS ON TETRAHEDRAL MESHES

CROSS REFERENCE TO RELATED APPLICATION

This application claims priority to, and the benefit of, U.S. Provisional Patent Application Ser. No. 63/471,587 filed on Jun. 7, 2023 and entitled "CONVOLUTIONAL NEURAL NETWORKS ON TETRAHEDRAL MESHES." The content of the foregoing application is hereby incorporated by reference, except for any subject matter disclaimers or disavowals, and except to the extent of any conflict with the disclosure of the present application, in which case the disclosure of the present application shall control.

FEDERALLY SPONSORED RESEARCH OR DEVELOPMENT

This invention was made with government support under R21 AG065942 awarded by the National Institutes of Health. The government has certain rights in the invention.

TECHNICAL FIELD

The present disclosure relates to methods of graphing convolutional neural networks on tetrahedral meshes.

BACKGROUND

Convolutional neural networks (CNN) have been broadly studied on images, videos, graphs, and triangular meshes. However, it has seldom been studied on tetrahedral meshes. Accordingly, improved approaches remain desirable.

SUMMARY

In an aspect, a method of using a tetrahedral mesh on a neural network is provided, comprising: computing a volumetric Laplace Beltrami operator (LBO) for the tetrahedral mesh; feeding into the neural network the LBO and a set of signals for each vertex of the neural network; and down-sampling the tetrahedral.

In embodiments, computing the volumetric LBO is performed based on the following function:

$$\Delta f(v_{i,}) = \frac{1}{d_i} \sum_{j \in N(i)} k_{i,j}(f(v_i) - f(v_j))$$

where N(i) includes the adjacent vertices of vertex $v_i$, and $d_i$ is the total tetrahedral volume of adjacent tetrahedra to vertex $v_i$, and $k_{i,j}$ is the string constant.

In embodiments, the signals comprise at least one input signal and at least one output signal.

In embodiments, the at least one input signal is defined as:

$$x_{in} \in R^N.$$

In embodiments, the at least one output signal is defined as:

$$x_{out} \in R^M.$$

In embodiments, a convolution network is defined as:

$$x_{out} = g * T \ x_{in} = \Phi\big((\Phi^T g) \odot (\Phi^T x_{in})\big) = \Phi f(\Lambda)\Phi^T x_{in}$$

in which $\odot$ is the element-wise product, $f(\Lambda)$ is the general function based on the eigen-value matrix $\Lambda$, and $\Phi$ is the eigen-vector matrix.

In embodiments, a convolution network is defined as:

$$x_{out} = \sum_{m=0}^{K} \theta_m \ T_m \ (L_{tet}) \ x_{in}$$

where $\theta_m$ are a set of learnable model parameters denoting the coefficients of the polynomials, and $Tm \in R_{n*n}$ is the Chebyshev polynomial of order k.

In embodiments, down-sampling the tetrahedral mesh is performed per the following function:

$$d(v_i, v_j) = -A_{i,j}\left(\frac{1}{D_{ii}} + \frac{1}{D_{jj}}\right)$$

In embodiments, the tetrahedral mesh is decimated by an order of two using the function:

$$d(v_i, v_j) = -A_{i,j}\left(\frac{1}{D_{ii}} + \frac{1}{D_{jj}}\right)$$

In an aspect, a method is provided comprising: computing a volumetric Laplace Beltrami Operator (LBO) for a tetrahedral mesh, wherein computing the volumetric LBO is performed based on the following function:

$$\Delta f(v_{i,}) = \frac{1}{d_i} \sum_{j \in N(i)} k_{i,j}(f(v_i) - f(v_j))$$

where N(i) includes the adjacent vertices of vertex $v_i$, and $d_i$ is total tetrahedral volume of adjacent tetrahedra to vertex $v_i$, and $k_{i,j}$ is the string constant.

In embodiments, the method further comprises feeding the volumetric LBO into a neural network. In embodiments, the method further comprises feeding a set of signals for each vertex of the neural network. In embodiments, the set of signals comprises at least one input signal and at least one output signal.

In embodiments, the at least one input signal is defined as:

$$X_{in} \in R^N.$$

In embodiments, the at least one output signal is defined as:

$$x_{out} \in R^M.$$

In an aspect, a method is provided comprising: down-sampling of a tetrahedral mesh on a neural network, wherein down-sampling is performed per the following cost function:

$$d(v_i, v_j) = -A_{i,j}\left(\frac{1}{D_{ii}} + \frac{1}{D_{jj}}\right)$$

In embodiments, the tetrahedral mesh is decimated by an order of two using the function:

$$d(v_i, v_j) = -A_{i,j}\left(\frac{1}{D_{ii}} + \frac{1}{D_{jj}}\right)$$

In embodiments, each layer of the neural network includes a down-sampling size of ¼. In embodiments, the method further comprises feeding each layer of the neural network into a pre-computed volumetric LBO. In embodiments, the method further comprises computing the volumetric LBO based on the following function:

$$\Delta f(v_{i,}) = \frac{1}{d_i}\sum_{j\in N(i)} k_{i,j}(f(v_i) - f(v_j))$$

where N(i) includes the adjacent vertices of vertex $v_i$, and $d_i$ is total tetrahedral volume of adjacent tetrahedra to vertex $v_i$, and $k_{i,j}$ is the string constant.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
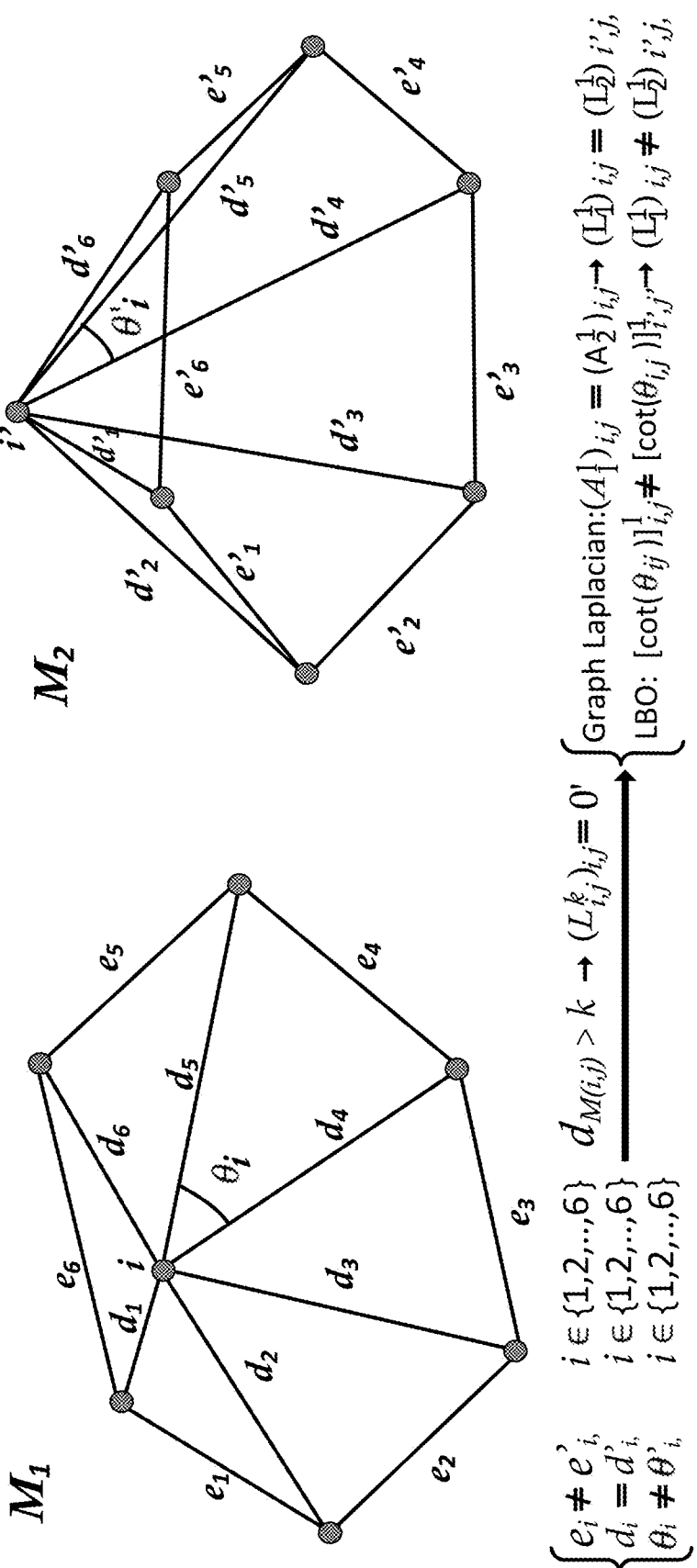
FIG. 1 provides an exemplary embodiment of the comparison between LBO and graph Laplacian-based spectral filters represented by $k^{th}$ order polynomials of a mesh in the 1-ring neighbor of a given vertex (i in M1, i' in M2). The Laplacian of $k^{th}$ order polynomials are exactly k localized, therefore, we use $(L^i{}_m)i,j$ to show the 1-localized Laplacian and $(A^i{}_m)i,j$ 1-localized adjacency matrix around vertices i and i' in this example. As depicted, two meshes have similar corresponding edge-lengths within the 1-ring of vertex i and i'. Thus, the 1-localized graph Laplacian of both meshes is similar, while their 1-localized LBO are different due to differences in cotangent matrix weights. The surface mesh is used for simplified intuition.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any functions or steps may be outsourced to or performed by one or more third parties. Furthermore, any reference to singular includes plural embodiments and any reference to more than one component may include a singular embodiment.

Given the merits of using volumetric meshes in applications like brain image analysis, we introduce a novel interpretable graph CNN framework for the tetrahedral mesh structure. In some embodiments, our model exploits the volumetric Laplace Beltrami Operator (LBO) to define filters over commonly used graph Laplacian which lacks the Riemannian metric information of 3D manifolds. In some embodiments new objective functions are introduced for localized minimum cuts in the Graclus algorithm based on the LBO. In some embodiments, a piece-wise constant approximation scheme that uses the clustering assignment matrix to estimate the LBO on sampled meshes after each pooling is employed. In some embodiments, adapting the Gradient-weighted Class Activation Mapping algorithm for tetrahedral meshes, the obtained heatmaps are used to visualize discovered regions-of-interest as biomarkers. In some embodiments, the effectiveness of the model is demonstrated on cortical tetrahedral meshes from patients with Alzheimer's disease, as there is scientific evidence showing the correlation of cortical thickness to neurodegenerative disease progression. Our results show the superiority of our LBO-based convolution layer and adapted pooling over the conventionally used unitary cortical thickness, graph Laplacian, and point cloud representation.

Since the emergence of geometric deep learning research, many researchers have sought to develop learning methods on non-Euclidean domains like point clouds, surface meshes, and graphs. In brain magnetic resonance imaging (MRI) analysis, geometric deep learning has been widely employed for applications in brain network analysis, parcellation of brain regions, and brain cortical surface analysis. In a benchmark study, authors addressed the common limitations of widely used graph neural networks (GNNs) on cortical surface meshes. While the majority of these studies focus on using voxel representation and surface mesh, limitations like limited grid resolution cannot characterize complex geometrical curved surfaces precisely. Cortical thickness is a remarkable AD imaging biomarker; therefore, building learning-based methods will be advantageous by exploiting volumetric meshes over surface meshes since the thickness is inherently embedded in volume. Using volumetric mesh representation also potentially helps with the over-squashing nature of Message Passing Neural Networks (MPNN) by interacting with long-range nodes through interior nodes. Thus, developing efficient volumetric deep learning methods to analyze grey matter morphometry may provide a means to analyze the totality of available brain shape information and open up new opportunities to study brain development and intervention outcomes.

While a manifold can be represented as a graph to employ graph convolutional networks, the majority of GNN models are not suitable for applying to volumetric mesh data. First, the Riemannian metric is absent in a uniform graph representation. Second and foremost, these methods mostly, are not scalable to very large sample sizes like tetrahedral meshes with millions of edges and vertices. Although there are a few methods tailored specifically to work on 3D surface meshes like MeshCNN (Convolutional Neural Networks), these methods are particularly designed for triangular meshes and are not scalable to meshes with a high number of vertices. Consequently, to opt for a method that is both scalable to tetrahedral meshes and computationally inexpensive, a framework like ChebyNet, modified with volumetric LBO over graph Laplacian, is an appropriate candidate to adapt for the tetrahedral meshes.

Although deep learning on mesh has been studied in recent years, few studies have employed explainable methods for qualitative assessment. Generally, to better explain geometric deep learning models, some methods have been proposed in recent years. Gradient-weighted Class Activation Map (Grad-CAM) on graphs is one of the first methods, using the gradient of the target task flowing back to the final convolution layer to create a localization map to visualize important nodes in the prediction task. This technique is commonplace in CNN and GNN models, however, the generalization of the concept is rarely used on surface mesh data. Specifically, Grad-CAM has not been investigated on volumetric meshes, and it is worth generalizing such an explainable technique for the medical image analysis community for a better interpretation of the deep learning model.

In an aspect, a Tetrahedral Mesh CNN (TetCNN) is developed to address the issues mentioned above. Using the tetrahedral Laplace Beltrami operator (LBO) over graph Laplacian, the Riemannian metric is used in tetrahedral meshes to capture intrinsic geometric features. FIG. 1 demonstrates that the LBO successfully characterizes the difference between two mesh structures while the graph Laplacian fails. Additionally, in some aspects novel designs are used on the pooling layers and adopt the polynomial approximation for computational efficiency. In some embodiments, TetCNN is the first of its kind and an exclusive geometric deep-learning model on tetrahedral meshes. In some embodiments, volumetric LBO is used to replace the graph Laplacian adopted in ChebyNet. In some embodiments, the Graclus algorithm is used by adapting a localized minimum-cut objective function using the cotangent and mass matrix. In some embodiments, the LBO is approximated on down-sampled mesh with the piece-wise linear approximation function. This avoids the re-computation of Laplacian in deeper layers. In some embodiments, the generalization of Grad-CAM to the tetrahedral mesh may be used for biomarker identification. Experimental embodiments demonstrate the effectiveness of our proposed TCNN framework for AD research.

Disclosed herein are graph convolutional neural network algorithms on tetrahedral meshes using an approximation of the volumetric Laplace Beltrami Operator (LBO). Using tetrahedral meshes gives an edge in specific applications compared to its counterparts, surface mesh, and point-cloud representation. One typical example is the usage of tetrahedral mesh makes data representation of structural thickness and internal values more informative. It may have wide applications in medical imaging analysis, e.g., cortical/cranial thickness analysis, knee cartilage thickness analysis, etc. and solid animation.

In some embodiments, volumetric LBO is used to construct convolution filters with some major adaptions. First, in some embodiments, using LBO over graph Laplacian, we have to pre-compute LBO. Second, in some embodiments, we adapt the localized min-cut cost function in the node clustering algorithm for mesh down-sampling using the mass and stiffness matrix of the LBO. Third, in some embodiments, we apply a simple constant piece-wise approximation method using the clustering assignment matrix to approximate LBO after each mesh down-sampling. Using these methodologies, we create the Tetrahedral Mesh CNN, i.e., the TetCNN framework. This convolutional neural network is applicable to volumetric meshes for different tasks without the need for equal-size input mesh, which is a constraint on some graph neural network frameworks.

In some embodiments, a scalable algorithm to apply to tetrahedral meshes is used. Besides its efficient computational cost, we have proposed a framework enjoying the spectrum of LBO rather than graph Laplacian. TetCNN can help with many supervised learning tasks, including any one or more of classification, regression, and segmentation.

In some embodiments, the proposed pipeline starts with the pre-computation of the volumetric LBO of each tetrahedral mesh. Tetrahedral meshes can be created using closed boundary surfaces like in cortical ribbon. In some embodiments one can use the area enclosed between the pial and white matter surface mesh, and then using the tetrahedral mesh software like TetGen, the tetrahedral mesh can be built. In some embodiments, after the precomputation of LBO, using the convolution theory on graph signals, we use the approximated polynomial of LBO instead of explicitly decomposing it, which is very time-consuming. Using the polynomial approximated LBO. The filters become localized in the spatial domain, and using the efficient recursive formula for the computation of polynomials, the full convolution becomes less computationally expensive by a large margin.

Disclosed herein are methods of using volumetric LBO on top of a graph neural network model. In some embodiments, the methods result in better adaption to volumetric mesh that enjoys metric instead of a uniform graph. Without any requirement of the input size of the mesh, both in terms of scalability and difference in the number of nodes, TetCNN can handle the different input sizes by approximating LBO on each mesh in deeper layers after the down-sampling. Also, the conventionally used Grad-CAM can be adapted to tetrahedral meshes for better visualization of capturing regions of interest for group-level studies.

Aspects of the disclosure have at least any one or more of the following advantages: (1) scalable to large meshes; (2) application to tetrahedral meshes with volumetric LBO and approximation of the spectrum using polynomial approximation; and (3) approximation of LBO based on node clustering assignment matrix used in down-sampling.

Using the Tetrahedral Laplace Beltrami Operator (LBO), embodiments disclosed herein are able to define filters in order to form a mesh of a 3D image. The meshes disclosed herein are able to represent structural thickness of a system. Using the ChebyNet framework, volumetric LBO was used to construct filters, the method was able to construct clusters that approximate the LBO after each sample. The model effectiveness was demonstrated using patients with Alzheimer's disease to determine disease progression.

Methods

Figure 2:
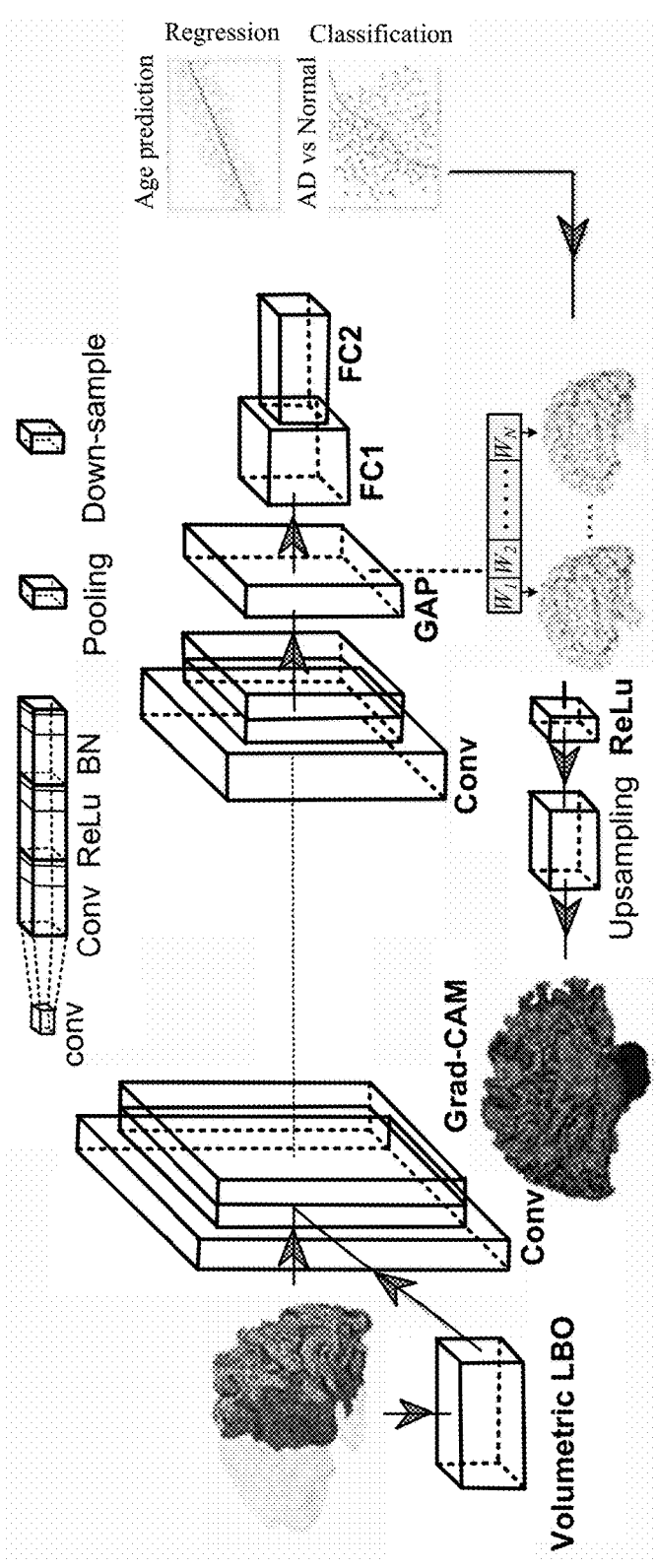
FIG. 2 illustrates an exemplary embodiment of TetCNN architecture for the classification risk. Pre-computed LBO and xyz features are fed to the network with 5 layers. Each layer includes a down-sampling of size ¼ and a pooling layer afterward except for "conv5", which consists of a global average pooling (GAP). Fully connected (FC) layers and a Sigmoid activation function are used for the binary classification at the end. Grad-CAM is adopted to visualize important biomarkers.

In some embodiments, in the LBO-based TetCNN framework, first, the volumetric LBO for each tetrahedral mesh was computed. Secondly, in some embodiments, together with the LBO, the network was fed a set of input features for each vertex, like the 3D coordinates of each vertex. In some embodiments, having built a new graph convolution layer based on the LBO, the next step was todown-sample the mesh with an efficient down-sampling and pooling layer to learn hierarchical feature representation for the large-sized input data. FIG. 2 illustrates an exemplary embodiment of the pipeline for the binary classification task by defining specific components of our deep learning model.

Tetrahedral Laplace Beltrami Operator

In some embodiments, let T represent the tetrahedral mesh with a set of vertices $\{v_i\}^n$ where n denotes the total number of vertices, and $\Delta_{tet}$ be the volumetric LBO on T, which is a linear differential operator. For a Riemannian manifold, given $f \in C^2$, a real-valued function, the eigen-system of Laplacian is $\Delta_{tet} f = -\lambda f$. The solution to this eigen-system problem can be approximated by a piece-wise linear function $f$ over the tetrahedral mesh T. The lumped discrete LBO on T is defined as follows:

$$\Delta f(v_{i_,}) = \frac{1}{d_i} \sum_{j \in N(i)} k_{i,j}(f(v_i) - f(v_j)) \qquad \text{(Equation 1)}$$

where N(i) includes the adjacent vertices of vertex $v_i$, and $d_i$ is total tetrahedral volume of adjacent tetrahedra to vertex $v_i$, and $k_{i,j}$ is the string constant. In some embodiments the stiffness matrix is defined as A=W−K in which W=diag $(w_1, w_2, \ldots, w_n)$ is the diagonal matrix comprised of weights $w_i = \Sigma_{j \in N(i)} k_{i,j}$. For $A_{ij}$ we have:

$$A_{i,j} = \begin{cases} k_{i,j} = \frac{1}{12} \sum_{m=1}^{k} l_m^{(i,j)} \cot(\theta_m^{(i,j)}), & \text{if } (i,j) \in E \\ 0, & \text{if } (i,j) \notin E \\ -\sum_{q \subseteq N(i)} k_{i,q} = -\sum_{q \subseteq N(i)} \frac{1}{12} \sum_{m=1}^{k} l_m^{(i,j)} \cot(\theta_m^{(i,j)}), & \text{if } i = j, \end{cases}$$

$$\text{(Equation 2)}$$

where $l_m^{(I,j)}$ is the length of the opposite edge to $(v_i, v_j)$ b in tetrahedron m sharing $(v_i, v_j)$, N(i) is the set of adjacent vertices to $(v_i)$, E is the set of edges in T, and finally $\theta_m^{i,j}$ is the dihedral angle of $(v_i, v_j)$ in tetrahedron m. In some embodiments, the lumped discrete tetrahedral LBO $L_{tet}$ given A and the volume mass matrix is defined as:

$$L_{tet} = D^{-1}A, \qquad \text{(Equation 3)}$$

in which D=diag $(d_1, d_2, \ldots, d_n)$

Spectral Filtering of Mesh Signals with Chebyshev Polynomial Approximation

In some embodiments, the input signal is defined on the mesh as $x_{in} \in R^N$ and the output of the convolved signal with filter g as $x_{out} \in R^M$. In some embodiments, the convolution operator on the tetrahedral mesh is denoted with T with $*_T$. Following the duality property of convolution in the time domain, and having the eigenvalue and eigen-functions of tetrahedral LBO at hand, we define the convolution as:

$$x_{out} = g *_T x_{in} = \Phi\big((\Phi^T g) \odot (\Phi^T x_{in})\big) = \Phi f(\Lambda)\Phi^T x_{in}, \qquad \text{(Equation 4)}$$

in which $\odot$ is the element-wise product, $f(\Lambda)$ is general function based on the eigen-value matrix $\Lambda$, and $\Phi$ is the eigen-vector matrix. The function $f$ can be approximated with the linear combination of k-order power of $\Lambda$ matrix as polynomial filters:

$$f(\Lambda) = \sum_{m=0}^{K-1} \theta_m \Lambda_{tet}^m, \qquad \text{(Equation 5)}$$

This formulation is localized in space and computationally less expensive than an arbitrary non-parametric filter $f(\Lambda)$. The convolution of kernel $f(\cdot)$ centered at vertex i with delta function $\delta_i$ given by $(f(L)\delta_i)_j = \Sigma_k \theta_k(L^k)_{i,j}$ gives the value at vertex j. Interestingly, since the $(L^k)_{i,j}$ is K-localized, i.e., $(L^k)_{i,j} = 0$ if d(i, j)>K, the locality is guaranteed with spectral filters approximated with k-th polynomials of LBO.

By plugging Eq. 5 in Eq. 4, the convolution can be expressed in terms of the Laplacian itself without any further need to calculate the eigen-functions. Chebyshev polynomials provide a boost in computational efficiency with a closed recursive formulation:

$$x_{out} = \sum_{m=0}^{K} \theta_m T_m(L_{tet})x_{in}, \qquad \text{(Equation 6)}$$

where $\theta_m$ are a set of learnable model parameters denoting the coefficients of the polynomials, and $T_m$ $R^{n*n}$ is the Chebyshev polynomial of order k.

Recursive formulation of Chebyshev polynomials. In some embodiments, the idea of using polynomial approximation is to avoid the costly decomposition and multiplication with $\Phi$. Therefore, in some embodiments, we parameterize $f(\Lambda_{tet})$ with LBO, i.e., $f(L_{tet})$, using the recursive formulation of Chebyshev polynomials. The cost immediately reduces to 0 $(K|\epsilon|) << 0$ $(n^2)$ and is desirable in graph convolution of big graphs and 3D meshes. The Chebyshev polynomial $T_m$ can be computed recursively using the form $T_m(x)=2\times T_{m-1}(x)-T_{m-2}$ with $T_0=1$ and $T_1=x$. Here, the $Tm(k)$ creates an orthonormal basis for $L2(\{-1,1], \mu)$ with $\mu$ being $$\frac{dy}{\sqrt{1-y^2}}$$

in the Hilbert space of square integrable functions. Now, given this recurrence, the $T_m(L_{tet})$ can be evaluated at $\tilde{L}_{tet}=\underline{2Ltet-I}$ with the initialization of the recurrence being $\tilde{x}_0=x_{in}$, $\tilde{x}_1=\tilde{L}_{tet}x_{in}$ with $\tilde{x}$ representing $T_m(L_{tet})x_{in}$ in Equation 6.

Mesh Coarsening and Pooling Operation

Although graph coarsening and mesh coarsening methods differ, using tetrahedral mesh down-sampling based on methods like Qslim or learning-based methods are both expensive and infeasible as they are template-based with registered shapes. Here we do not try to register various embodiments of tetrahedral meshes, and the number of vertices varies from mesh to mesh. In some embodiments, we propose to build a sub-sampling approach but using spectral-aware configuration.

Defining the Normalized Min-Cut Based on Tetrahedral LBO. In some embodiments, the objective function is based on normalized cut acting on vertices in a tetrahedral mesh. In some embodiments, an affinity value between $(v_i, v_j)$ and $vol(\bullet)$ is used to capture the volume of each node. For the volume in the normalized cut problem of a simple graph, we use the degree of the node; however, in surface and volumetric meshes, this notion refers to the area and volume of the adjacent surface and tetrahedrons of the vertex, respectively. The proposed affinity or edge distance can be correlated with the A and D in Equation 3. Thus, the proposed affinity distance as a new objective function for the local normalized cut is:

$$d(v_i, v_j) = -A_{i,j}\left(\frac{1}{D_{ii}} + \frac{1}{D_{jj}}\right) \qquad \text{(Equation 7)}$$

Using this clustering objective function, at each step, we can decimate the mesh by order of two. Consequently, $D_c(i,i)$ with c denoting the coarsen graph, are updated by the sum of their weights for the new matched vertices. The algorithm can repeat until the vertices are matched. In some embodiments, at each convolution layer, we use two or three consecutive pooling since the size of the tetrahedral mesh is very large.

After coarsening, it can be challenging to match the new set of vertices with that of the previous ones. In some embodiments, an approach is used to exploit a balanced binary tree and rearrangement of vertices by creating fake nodes in the binary tree structure.

Approximation of LBO on Down-sampled Mesh. In some embodiments, after each pooling, a mesh is coarsened and an updated LBO is used to pass it to the new convolution layer. In some embodiments, the piece-wise constant approximation approach is adopted where the clustering assignment matrix G is used. This choice of G is the simple yet efficient one as the matrix is already computed for Graclus clustering. In some literature, they refer to G as the prolongation operator. Now the updated Laplacian $\hat{L}$, can be derived using the following equation for $\hat{L}$:

$$\hat{L} = G^T LG, \qquad \text{(Equation 8)}$$

Grad-CAM for Tetrahedral Mesh. Toutilize Grad-CAM for our framework, in some embodiments, the Grad-CAM is adapted to our tetrahedral mesh. In some embodiments, the k-th feature is used after the GAP layer denoted as $f_k$ which is calculated based on last layer of the network, respectively. In some embodiments, weights of Grad-CAM for class c of feature k in a tetrahedral mesh can be calculated using:

$$\alpha_k^{l,c} = \frac{1}{N}\sum_{n=1}^{N}\frac{\partial y^c}{\partial X_{k,n}^L} \qquad \text{(Equation 9)}$$

In some embodiments, to calculate the final heat map, an activation function like ReLU and an upsampling method is applied to project the weights to our original input mesh. As for upsampling, in some embodiments, the KNN interpolation is used. In some embodiments, the final heat-map of the last layer His as follows:

$$H_c^{L,n} = ReLU\left(\sum_k \alpha_k^{l,c} X_{k,n}^L\right) \qquad \text{(Equation 10)}$$

EXAMPLES

The examples below are meant for illustrative purposes and are not meant to be limiting in any way on the embodiments described herein.

Experiments and Results

Data Processing. In the experiments, the diagnosis task for Alzheimer's disease was studied. The dataset contained 116 Alzheimer's disease (AD) patients, and 137 normal controls (NC) from the Alzheimer's Disease Neuroimaging Initiative phase 2 (ADNI-2) baseline initial-visit dataset. The subjects underwent the whole-brain MRI scan using a 3-Tesla MRI scanner.

Figure 3:
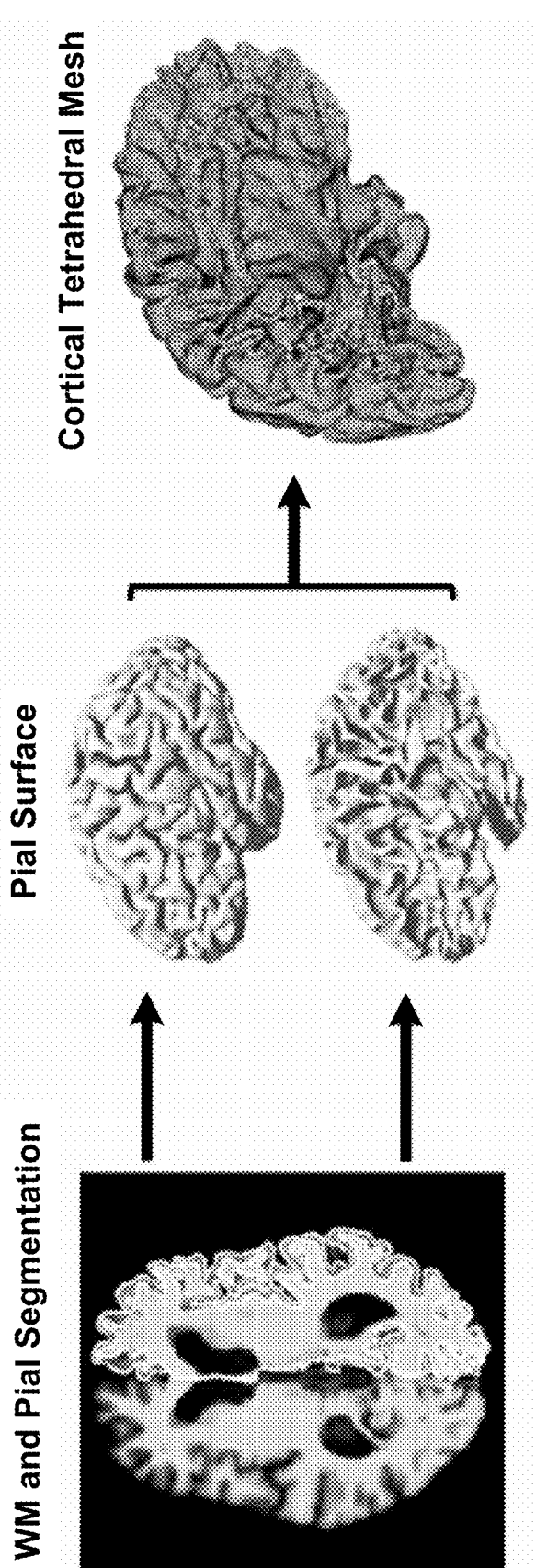
FIG. 3 illustrates an exemplary embodiment of a procedure of creating a cortical tetrahedral mesh of a closed surface from white and pial surfaces pre-processed and segmented by FreeSurfer.

Cortical Tetrahedral Mesh Generation. To remove self-intersections while combining pial and white surfaces, we repeatedly moved erroneous nodes and their small neighborhood along the inward normal direction by a small step size. This process continued to be done until the intersection was removed. Consequently, we used local smoothing on the modified nodes. In some embodiments, TetGen was used to create tetrahedral meshes of the closed surfaces. FIG. 3 illustrates the cortical tetrahedral mesh generation process. In some embodiments, the number of vertices in the tetrahedral meshes was around 150 k. To validate the robustness of our model, the simple xyz coordinate was as input features and normalized them using min-max normalization. In some embodiments, using informative features was avoided as they may contribute to the final performance rather than the TetCNN itself. In some embodiments, the lumped LBO was precomputed for the meshes and embedded them in our customized data-loader.

TABLE 1

Classification results between AD vs. NC under different settings and parameters

| Method | ACC | SEN | SPE |
|---|---|---|---|
| Thickness* | 76.2% | 77.0% | 78.6% |
| LBO (1)[+] | 91.7% +/− 2.1 | 89.1% +/− 5.1 | 93.3% +/− 3.5 |
| LBO (2)[+] | 90.8% +/− 2.0 | 87.5% +/− 4.8 | 92.1% +/− 3.1 |
| GL (1) | 87.1% +/− 1.8 | 90.4% +/− 4.7 | 89.5% +/− 3.1 |
| GL (2) | 85.7% +/− 2.1 | 90.0% +/− 4.2 | 87.5% +/− 2.9 |
| LBO(1) + E_pool | 84.1% +/− 2.4 | 83.5% +/− 4.9 | 87.1% +/− 3.5 |
| LBO(1) + LBO_pool | 91.7% +/−2.1 | 89.1% +/− 5.1 | 92.1% +/− 3.5 |

(GL = graph Laplacian, (.) defines the polynomial order k for LBO and GL, E_pool = Euclidean-based pooling).
*Cortical thickness generated by FreeSurfer.
[+]We use LBO-based pooling.

TABLE 2

Classification results between AD vs. NC comparison to the baseline using different data representation. The number of different subjects is also for fair comparison

| Study | ACC | SEN | SPE | Subject Split |
|---|---|---|---|---|
| GF-Net | 94.1% +/− 2.8 | 93.2% +/− 2.4 | 90.6% +/− 2.6 | (188,229) |
| Qui et al. | 83.4% | 76.7% | 88.9% | (188,229) |
| ViT3D | 85.5% +/− 2.9 | 87.9% +/− 3.6 | 86.8% +/− 3.7 | (188,229) |
| Huang et al. | 90.9% +/− 0.6 | 91.3% +/− 0.1 | 90.7% +/− 0.5 | (261,400) |
| H-FCN | 90.5% | 90.5% | 91.3% | (389,400) |
| RESNet3D | 87.7% +/− 3.5 | 90.2% +/− 2.8 | 89.7% +/− 3.0 | (188,229) |
| DA-Net | 92.4% | 91.0 % | 93.8% | (389,400) |
| Ours | 91.7% +/− 2.1 | 89.1% +/− 5.1 | 92.1% +/ 3.5 | (116,137) |

Classification Model Setup. For comparison between different manifold spectral models, we tested our model based on both tetrahedral LBO and graph Laplacian. For the sake of equal comparison among each setting, we used the same network architecture and hyper-parameters. We used 5 TetCNN layers followed by ReLU activation function and batch-normalization. Before the two fully connected layers, we applied a GAP to ensure the same size feature space among the mini-batches. We used 10-fold cross-validation and picked 15% of the training set for validation. We set the hyper-parameter k to two different values as it is shown in Table 1. The batch size for TetCNN experiments was 8, and the loss function used for the model was Cross-Entropy. ADAM optimizer with Learning $10^{-3}$, weight decay of $10^{-4}$, and number of epochs to 150 were used for training the model. For the AD vs. NC classification performance evaluation, we used three measures accuracy (ACC), sensitivity (SEN), and specificity (SPE). As a benchmark, we also used the FreeSurfer thickness features to train an AdaBoost classifier.

TABLE 3

Comparison of TetCNN with DGCNN and PointNet.

| | DGCNN | PointNet | TetCNN |
|---|---|---|---|
| ACC | 73.45% | 77.35% | 91.7% |

Point Clouds Model Setup for Classification. Point clouds have been widely used in deep learning literature to study manifold data. In our work, we further implemented DGCNN and PointNet as our baseline models to analyze volume data. For both PointNet and DGCNN, we trained the network with batch size 1 to feed the whole data without losing points for a fair comparison. Experiments were implemented in Python 3.7 with Pytorch Geometric Age Prediction Setup. In order to further compare the TetCNN using volumetric LBO and its Graph Laplacian counterpart, we used a regression model to see the difference in age prediction. We used the same processed data from the ADNI dataset but trained the model on normal subjects. Further, we tested the trained model on both normal subjects and independent AD sub-jects to see the accuracy and effect of AD on age prediction. In order for an unbiased age prediction on the AD cohort, we made a test set that matched the age distribution of normal subjects. We used 5-k fold cross-validation. As for AD subjects, we randomly chose 25 subjects to test on the trained model and repeated the experiment 5 times. The parameters of the network are the same as the classification model except for the last fully connected layer. The output dimension is one as we predict a number instead of discrete class labels.

Classification Results. As we see in Table 1, TetCNN with k=1 outperformed any other setting, including graph Laplacian with the same parameter.

TABLE 4

Age prediction result.

| Method | RMSE (NC) | RMSE (AD) |
|---|---|---|
| LBO(1) | 6.3 +/− 0.5 yr | 7.2 +/− 0.7 yr |
| LBO(2) | 6.5 +/− 0.6 yr | 7.4 +/− 0.4 yr |
| GL(1) | 7.2 +/− 0.4 yr | 7.9 +/− 0.4 yr |
| GL(2) | 7.1 +/− 0.5 yr | 8.1 +/− 0.5 yr |

We expected the increase in k would result in boosted performance, however, the results are marginally worse. We assume this behavior demonstrates the fact that 1-ring neighbor provides sufficient information that making the receptive field larger does not contribute to more discriminative features, necessarily. Overall, TetCNN with an LBO-based setting outperformed its graph Laplacian counterpart, presumably, owing to both rich geometric features learned using LBO, as exhaustively depicted in FIG. 1, and efficient spectral-based mesh down-sampling using the proposed objective function in Eq. 7. We also tested our new Graclus based on LBO and compared it to the default localized min-cut based on the Euclidean distance between two vertices.

Regarding the comparison with point cloud learning frameworks, our observation in Table 3 shows that DGCNN and PointNet could not provide comparable results with our method due to the lack of deformation sensitivity in point cloud representation. These methods produce state-of-the-art results for the classification of completely distinct objects but fail to compete with mesh structure for learning subtle deformations in volume data.

Lastly, we compared our TetCNN with other methods in the literature that are based on either brain network, surface mesh or voxel-based representations. Our results, though have a smaller dataset size for training, have comparable performance to state-of-the-art models.

Figure 4:
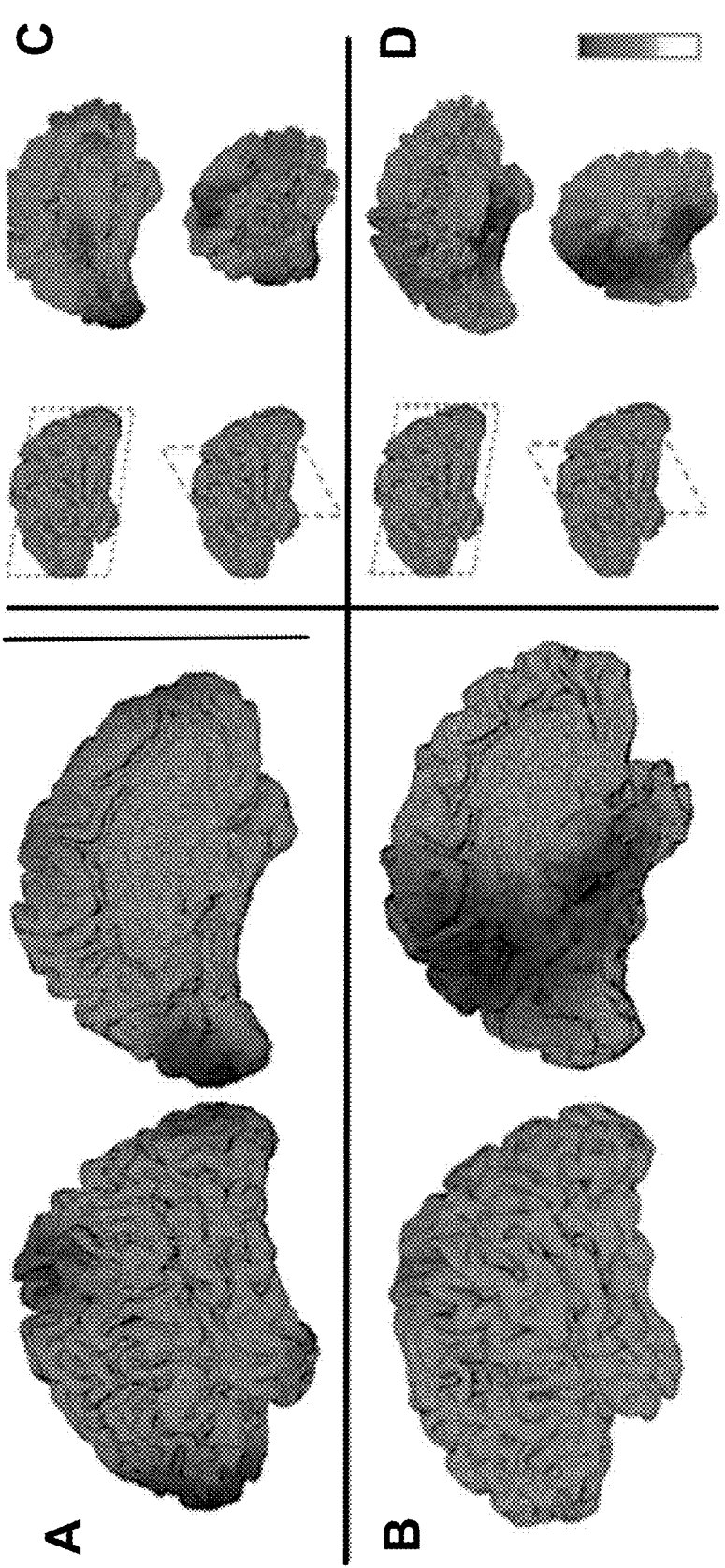
FIG. 4 provides data of Grad-CAM results for the Alzheimer's disease (AD) class showing important regions. Comparison between LBO-based (top) and graph Laplacian (bottom) on the left hemisphere of the brain. A-B From left: Lateral-Medial view. C-D From top: Sagittal-Coronal view. Darker colors show more importance, hence greater weight.

Grad-CAM Results. In FIG. 4, we illustrated the Grad-CAM results on the left grey matter tetrahedral mesh of AD subjects, trained on both LBO (A) and Graph Laplacian-based scheme (B). As illustrated, the important regions for the AD class are different in the two approaches. The identified ROIs from the LBO are more centered at the medial temporal lobe, frontal lobe, and posterior cingulate, areas that are affected by AD. But the ROIs from the graph Laplacian are more scattered, without concise ROIs. Although more validations are desired, the current results demonstrate our interpretable model may identify important AD biomarkers.

Age Prediction Results. We tested our model on a regression task to compare Graph Laplacian and LBO. Furthermore, we aimed to see if the age prediction in AD patients has a larger margin of error with respect to normal subjects. Results in Table 4 show the consistent outperformance of LBO-based TetCNN over its graph Laplacian counterpart. Also, it shows an erroneous prediction of AD patients with a margin of around one year which is predictable due to changes in the cortical thickness of AD patients being more severe.

Complexity. Finally, in terms of computational complexity, the parameterized filter addresses the non-locality in space and high learning complexity of O(n) problem of a non-parametric filter by employing the polynomial approximation of the tetrahedral LBO. Our novel approach reduced the time complexity to the dimension of k, hence O(k).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

Systems, methods, and apparatus are provided herein. In the detailed description herein, references to "various exemplary embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of using a tetrahedral mesh on a neural network, comprising:
   computing a volumetric Laplace Beltrami operator (LBO) for the tetrahedral mesh;
   feeding into the neural network the LBO and a set of signals for each vertex of the neural network; and
   down-sampling the tetrahedral mesh.

2. The method of claim 1, wherein computing the volumetric LBO is performed based on the following function:

$$\Delta f(v_i) = \frac{1}{d_i} \sum_{j \in N(i)} k_{i,j}(f(v_i) - f(v_j))$$

where N(i) includes the adjacent vertices of vertex $v_i$, $d_i$ is total tetrahedral volume of adjacent tetrahedra to vertex $v_i$, $k_{i,j}$ is the string constant, $f(v_i)$ and $f(v_j)$ are the scalar function values at vertices $v_i$ and $v_j$ respectively, and $\Delta f(v_i)$ is the Laplacian operator applied to $f$ at vertex $v_i$.

3. The method of claim 1, wherein the set of signals comprises at least one input signal and at least one output signal.

4. The method of claim 3, wherein the at least one input signal comprises the three-dimensional coordinates of each vertex.

5. The method of claim 4, wherein the at least one output signal comprises the output of the convolved signal with filter g.

6. The method of claim 5, wherein a convolution is defined as:

$$x_{out} = g * Tx_{in} = \Phi\big((\Phi^T g) \odot (\Phi^T x_{in})\big) = \Phi f(\Lambda)\Phi^T x_{in},$$

in which $\odot$ is the element-wise product, $f(\Lambda)$ is a general function based on the eigen-value matrix $\Lambda$, $\Phi$ is the eigen-vector matrix, $x_{in}$ and $x_{out}$ are the input and output graph signals respectively, and $\Phi^T G$ and $\Phi^T x_{in}$ are the spectral representations of the filter and input signal obtained via the graph Fourier transform.

7. The method of claim 5, wherein a convolution is defined as:

$$x_{out} = \sum_{m=0}^{K} \Phi_m T_m(L_{tet})x_{in}$$

where $\theta_m$ are a set of learnable model parameters denoting the coefficients of the polynomials, and $Tm \in R_{n \times n}$ is the Chebyshev polynomial of order k, where $x_{in}$ and $x_{out}$ are the input and output graph signals respectively, $\Phi_m$ denotes the m-th set of learnable parameters, and $L_{Tet}$ is the Laplacian matrix of the tetrahedral mesh.

8. The method of claim 1, wherein a lumped discrete LBO on Tis defined as:

$$\Delta f(v_i,) = \frac{1}{d_i} \sum_{j \in N(i)} k_{i,j}(f(v_i) - f(v_j))$$

where N (i) includes the adjacent vertices of vertex $v_i$, and $d_i$ is the total tetrahedral volume of adjacent tetrahedral to vertex $v_i$, and $k_{i,j}$ is the string constant, $f(v_i)$ and $f(v_j)$ are the scalar function values at vertices $v_i$ and $v_j$ respectively, and $\Delta f(v_i)$ is the Laplacian operator applied to $f$ at vertex $v_i$.

9. The method of claim 8, wherein the tetrahedral mesh is decimated by an order of two using the function:

$$d(v_i, v_j) = -A_{i,j}\left(\frac{1}{D_{ii}} + \frac{1}{D_{jj}}\right)$$

where $d(v_i, v_j)$ is the LBO-based edge weight between vertices $v_i$ and $v_j$ used in the Graclus pooling objective, $A_{ij}$ is the cotangent weight between vertices $v_i$ and $v_j$ derived from the stiffness matrix of the tetrahedral mesh, and $D_{ii}$ and $D_{jj}$ are the diagonal entries of the lumped mass matrix D corresponding to the total tetrahedral volume associated with vertices $v_i$ and $v_j$ respectively.

10. A method, comprising:
computing a volumetric Laplace Beltrami operator (LBO) for a tetrahedral mesh;
feeding the volumetric LBO into a neural network; and
feeding a set of signals for each vertex of the neural network, wherein computing the volumetric LBO is performed based on the following function:

$$\Delta f(v_i,) = \frac{1}{d_i} \sum_{j \in N(i)} k_{i,j}(f(v_i) - f(v_j))$$

where N(i) includes the adjacent vertices of vertex $v_i$, and $d_i$ is total tetrahedral volume of adjacent tetrahedra to vertex $v_i$, and $k_{i,j}$ is the string constant, $f(v_i)$ and $f(v_j)$ are the scalar function values at vertices $v_i$ and $v_j$ respectively, and $\Delta f(v_i)$ is the Laplacian operator applied to $f$ at vertex $v_i$.

11. The method of claim 10, wherein the set of signals comprises at least one input signal and at least one output signal.

12. The method of claim 11, wherein the at least one input signal comprises the three-dimensional coordinates of each vertex.

\* \* \* \* \*